United States Patent [19]
Grabon

[11] Patent Number: 5,943,421
[45] Date of Patent: Aug. 24, 1999

[54] PROCESSOR HAVING COMPRESSION AND ENCRYPTION CIRCUITRY

[75] Inventor: Robert J. Grabon, Cedar Rapids, Iowa

[73] Assignee: Norand Corporation, Cedar Rapids, Iowa

[21] Appl. No.: 08/712,341

[22] Filed: Sep. 11, 1996

Related U.S. Application Data

[60] Provisional application No. 60/003,543, Sep. 11, 1995.

[51] Int. Cl.$^6$ ........................................................ H04L 9/00
[52] U.S. Cl. .................................................................. 380/4
[58] Field of Search ................................. 380/4, 28, 49; 395/381, 384

[56] References Cited

U.S. PATENT DOCUMENTS

| | | | |
|---|---|---|---|
| 4,168,396 | 9/1979 | Best ............................................ | 380/4 |
| 4,278,837 | 7/1981 | Best ............................................ | 380/4 |
| 4,608,456 | 8/1986 | Paik et al. .................................. | 380/28 |
| 5,285,497 | 2/1994 | Thatcher, Jr. .............................. | 380/49 |
| 5,359,659 | 10/1994 | Rosenthal ................................... | 380/4 |
| 5,361,302 | 11/1994 | Malek et al. ............................... | 380/49 |
| 5,499,293 | 3/1996 | Behram et al. ............................. | 380/4 |
| 5,517,614 | 5/1996 | Tajima et al. .............................. | 380/28 |
| 5,632,024 | 5/1997 | Yajima et al. ............................. | 395/381 |
| 5,652,852 | 7/1997 | Yakota ....................................... | 395/384 |

*Primary Examiner*—Salvatore Cangialosi
*Attorney, Agent, or Firm*—Akin,Gump,Strauss,Hauer & Feld, L.L.P.

[57] ABSTRACT

A data processing system (100) includes a data processor or CPU (102) having decompression circuitry (208, 212) and decryption circuitry (210, 214) that operates on compressed/encrypted data to produce decompressed and decrypted data. The data processing system includes memory (104) in which instructions and data are stored in a compressed (110) and/or encrypted (114) format. The CPU (102) retrieves the compressed/encrypted data over a system bus (106). A bus interface unit (200) within the CPU (102) receives the compressed/encrypted data, decompresses and decrypts the data and stores the data in cache memory (202). An execution unit (204) and other components within the CPU (102) retrieve the decompressed and decrypted data and operate upon it. Alternatively, upon retrieval of compressed/encrypted data from memory (104) the data is stored in cache memory (202) in its compressed/encrypted format. Upon retrieval by the execution unit (204), the data is decompressed and decrypted in preparation for execution by the execution unit (204). A data processing system (400) of the present invention requires that the CPU (402) decrypt encrypted data. Thus, any devices accessing data in the system (400) over a network (426) without decryption by the CPU (402) retrieve encrypted data that cannot otherwise be decrypted.

18 Claims, 7 Drawing Sheets

PROCESSOR HAVING COMPRESSION AND ENCRYPTION CIRCUITRY

CROSS-REFERENCE TO RELATED APPLICATIONS

The present application claims priority pursuant to 35 U.S.C. Sec. 119(e) to U.S. Provisional Application Ser. No. 60/003,543, filed Sep. 11, 1995, which is hereby incorporated herein by reference in its entirety.

BACKGROUND

1. Technical Field

The present invention relates generally to digital computers, and, more specifically, relates to a data processor that retrieves compressed and/or encrypted data from storage over a relatively slow operating system bus and decompresses and/or decrypts the data using components that are connected to a relatively fast operating processor bus located within the data processor as it is received or just prior to execution. The present invention also relates to a data processor that employs decompression and decryption circuitry in a shared resource networking environment to guarantee data security of data stored within an associated data processing system.

2. Related Art

It is well known to compress and decompress data in a data processing system to reduce storage device usage. Software and systems employed to compress and decompress data and instructions (hereinafter "compression/decompression utilities") typically operate on data and instructions (hereinafter "data") in one of two manners. One type of compression/decompression utility operates on data transferred between electronic memory (i.e. random access memory [RAM], static random access memory [SRAM], etc.—hereinafter referred to as "RAM") and bulk storage (i.e. fixed hard discs, optical disks, magnetic tape drives, etc.—hereinafter referred to as "bulk storage"). The utility decompresses data transferred from bulk storage to RAM and compresses data transferred from RAM to bulk storage. By compressing and decompressing data in this fashion, this type of utility increases the amount of otherwise uncompressed data that can be stored in bulk storage of a fixed capacity.

Another type of compression/decompression utility compresses data stored in RAM. By compressing data that is written to RAM, this type of utility increases the amount of otherwise uncompressed data that may be stored in a fixed volume of RAM. One particular compression/decompression utility of this type operates in a time sharing mode in parallel with target processes. When a target process executes an access to RAM, the utility intercepts the access and performs a compression/decompression operation in conjunction with access. Thus, the utility increases overhead associated with operation of the target application and, although enhancing memory storage ability, increases required processor operations for equivalent tasks. The utility achieves an operational benefit only by reducing the number of required data transfers between RAM and slower bulk storage devices.

Another type of compression/decompression utility operates to compress and decompress complete files. When a particular file is written to bulk storage, the utility compresses the file and stores the file in bulk storage. When access to the file is required, the utility decompresses the file and writes the file to bulk storage in an uncompressed format. This type of compression/decompression utility typically operates in a stand-alone mode.

While these utilities addresses storage constraints, either in RAM or bulk storage, the utilities only indirectly enhance operation of the data processing system. In a typical data processing system, a data processor, also referred to as a central processing unit (CPU), executes instructions and operates on data that was previously stored in RAM or bulk storage. The CPU includes a large number of sub-components, each of which performs a particular function on the data. These sub-components typically communicate over a high-speed "processor bus" at a clocking frequency sufficient for the CPU to operate at or near full capacity. However, in typical data processing systems, the CPU operates only at a portion of its full capacity because of delays in retrieving instructions and data from RAM and/or bulk storage over a slower "system bus". To reduce a portion of these delays, modem CPUs typically include cache memories (high speed SRAM) coupled to the processor bus into which blocks of data are loaded. Once this data is loaded into the cache memory, the CPU may access data cache memory and operates at or near full capacity. However, when the CPU seeks data or instructions not present in cache memory, a "page fault" occurs and a block of data must retrieved from RAM or bulk storage over the system bus and loaded into cache memory. A page fault transfer is time consuming and disrupts operation of the CPU, often placing the CPU in a series of wait cycles until the required instructions and/or data are present in cache. The aforementioned utilities for enhancing system resources do not address this data transfer limitation.

Another problem of prior data processing systems relates to the encryption/decryption of security sensitive information stored within RAM or bulk storage. Many modern data processing systems are networked, allowing access to the data processing systems by other users of the network. Through system level instructions, other devices may access the RAM and bulk storage devices within the data processing system through a network interface. Security measures present within the network interface of the data processing system are insufficient to protect security sensitive data stored in RAM and bulk storage devices.

Thus, there lies a need for data processor and related processing system having improved operating characteristics in the transfer of data from RAM and bulk storage to the data processor. Further, there lies a need for an encryption/decryption system that operates to protect RAM and bulk storage contents from unauthorized accesses by other systems.

SUMMARY OF THE INVENTION

In one embodiment of a data processor or central processing unit (hereinafter interchangeably "CPU" and "data processor") and related components (hereinafter the combination of the CPU and related components will be referred to as the "data processing system") of the present invention, compressed instructions and/or data (collectively "data") is retrieved from memory (hereinafter "RAM") by the CPU, decompressed by the CPU upon receipt and stored in cache memory in a decompressed format. A hashing function respective to the received data allows a component of the CPU to decompress the compressed data as it is retrieved from RAM thus reducing processing requirements placed upon other components of the CPU (particularly the execution unit). Other decompression techniques may be employed to decompress the data as received in a serial mode or to decompress a full block of data after receipt. In either case, as compared to prior techniques, a reduced volume of data must be transferred over a slower system bus from memory of bulk storage to the CPU when a page fault occurs. Thus, the data processor of the present invention increases speed of operation of the data processing system by reducing the number of CPU wait states during a page fault.

The data processor accomplishes more efficient writes to memory in an analogous fashion by compressing the data prior to the writes. Because the compression and decompression of data is accomplished within the data processor, the operation of the present invention within a conventional data processing system is transparent to other data processing system components.

A further aspect of the present invention addresses the encryption/decryption of data. By storing data in an encrypted format in RAM and bulk storage and requiring that the CPU perform decryption and encryption operations on the data, the data stored on the system is extremely secure. Accesses to bulk storage via system components other than the CPU produce only encrypted data. Decryption and encryption of data is handled in a manner analogous to the technique of decompression and compression described above.

In one embodiment of the present invention, decompression and decryption (as well as compression and encryption) are performed by a bus interface unit operating between the fast operating processor bus and a slower system bus. Based upon status registers within the CPU that indicate whether, and what type of compression and encryption techniques are to be used, the bus interface unit operates upon data received from memory and bulk storage prior to storing the data in cache memory. Upon a write to memory or bulk storage, the bus interface unit operates to compress or encrypt the data prior to writing the data.

In another embodiment of the present invention, compressed and/or encrypted data is stored in cache memory and operated upon during execution. Based upon the contents of the status register, the execution unit within the CPU performs decompression and decryption operations upon the data just prior to its use. These operations are preferably performed in sequence by a pipe-line unit so that the operations do not delay operations of an execution unit within the CPU.

The teachings of the present invention apply equally as well to decoding and encoding of data as well as other operations that may otherwise be performed on data to change its format. Other aspects of the present invention will become apparent with further reference to the drawings and specification which follow.

DETAILED DESCRIPTION

Figure 1:
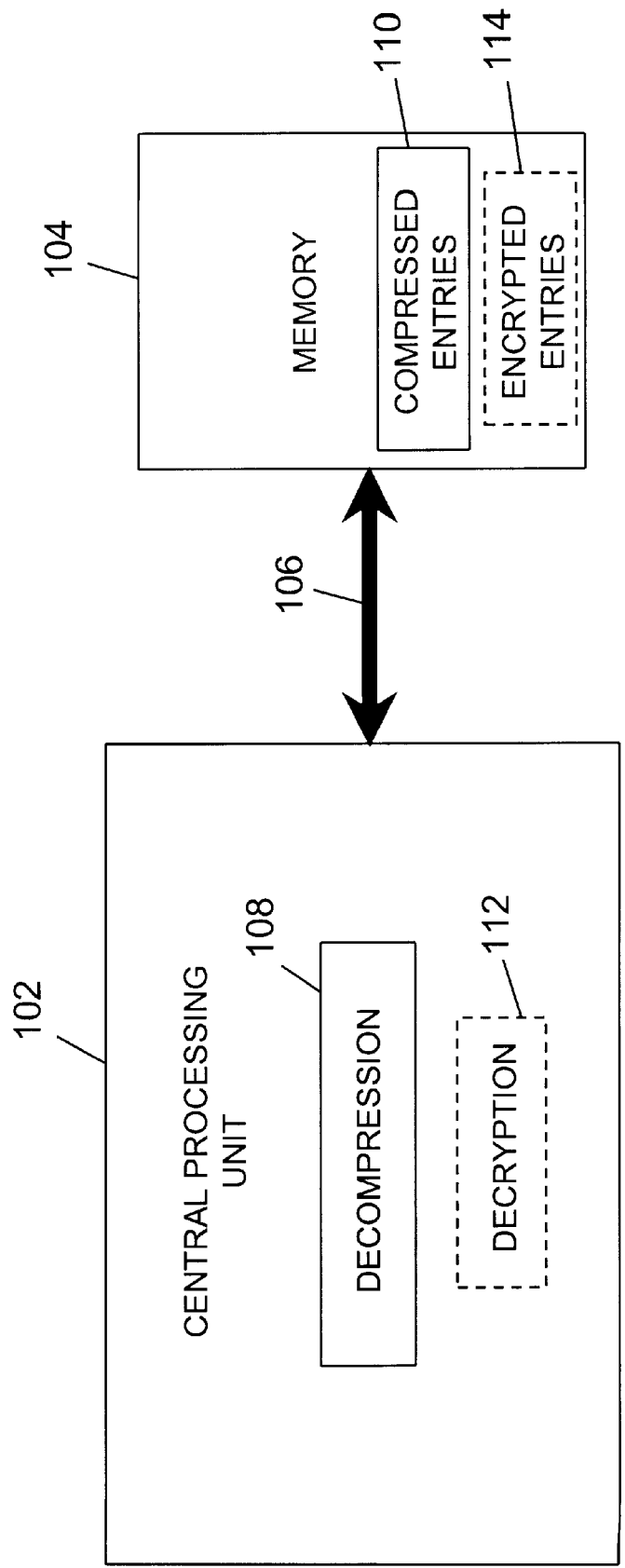
FIG. 1 is a block diagram illustrating a data processor (CPU) of the present invention, the CPU being coupled to memory so that compressed and encrypted data may be transferred between the CPU and the memory.

FIG. 1 is a block diagram of illustrating a data processing system 100 of the present invention having a data processor 102 (CPU) and memory 104 coupled to the CPU 102 via a system bus 106. The CPU 102 may comprise a typical processing unit such as those employed in personal computers, digital signal processing equipment, digital controllers and other types of complex integrated circuits designed and manufactured to perform processing functions. The system bus 106 includes data portions, address portions and control portions or appropriate width and capacity to facilitate the transfer of compressed and encrypted data between the CPU 102 and the memory 104. However, the system bus 106 need take no particular construction to be encompassed by the present invention and could comprise a serial link as well. Standard or specialized data transfer protocols may be employed to transfer data between the memory 104 and the CPU 102.

The CPU 102 comprises standard components required to perform standard processing functions. Such components could include execution units (as will be further described hereinafter), pipeline units, floating point units, integer units, arithmetic logic units, arithmetic units and various other components employed to perform data processing functions. The CPU 102 further comprises decompression circuitry 108 and may comprise decryption circuitry 112.

Memory 104 may comprise electronic memory such as RAM, ROM, SRAM, PROM, EPROM and EEPROM, magnetic disk storage, optical storage, magnetic tape storage, or another type of memory capable of storing data and instructions. The memory 104 is capable of storing compressed data entries 110 and encrypted data entries 114 as well as decompressed and decrypted data.

For purposes of the present invention, compressed data is referred to as data in a format that occupies less storage space than the same data in an expanded format. Further, encrypted data is referred to as data that has been operated upon so that it is in an encrypted format. Coded or encoded data refers to data in a format that has been operated upon so that it is in an encoded format as compared to an non-encoded format. The term coded may apply to compressed data or encrypted data depending upon the type of encoding employed and upon the purpose for such encoding. Differing terminology may also be employed without departing from the scope of the present invention.

The decompression circuitry 108 within the CPU 102 receives compressed data 110 from the memory 104 over the system bus 106 and decompresses the compressed data 110 to produce uncompressed data. As will be further described hereinafter, the decompression circuitry 108 may operate to decompress the compressed data 110 upon its receipt over the system bus 106 or may store the compressed data 110 within storage in the CPU 108 and decompress the compressed data 110 when required by an operation of the CPU 102.

In a similar fashion, the decryption circuitry 112 of the CPU receives encrypted data 114 from the memory 104 over the system bus 106 and decrypts the encrypted data 114 to produce decrypted data. The decryption circuitry 112 may decrypt the encrypted data 114 upon receipt by the CPU 102 over the system bus 106 or may perform the decoding when the data is required by the CPU 102.

Because compressed data passes across the system bus 106 prior to its decompression, fewer bus cycles are to transfer the data in its compressed format that would otherwise be required to transfer the data in an uncompressed format. Thus, upon a page fault by the CPU 102 wherein data must be retrieved from memory 104, less CPU 102 delay (in the form of fewer wait or no-operation cycles) results during the data retrieval. In this fashion, the CPU 102 operates at a higher efficiency than if data was transferred across the system bus 106 in an expanded format.

By requiring that decryption of data be performed within the CPU 102 by the decryption circuitry 112, data may be stored in memory 104 in a fully encrypted format. The CPU 102 operates in a user established encryption/decryption scheme to protect the proprietary nature of the encrypted data 114. Thus, other devices that may have access to the memory 104 of the data processing system 100 cannot use the data even though the data may be accessed by bypassing other security mechanisms that may be in place.

In an analogous fashion, the CPU 102 may compress and/or encrypt data prior to writing data across the system bus 106 to memory 104. The CPU 102 compression and/or encryption process consistent with the compression, coding and/or encryption methodology employed. Any suitable compression/decompression, encoding/decoding and encryption/decryption may be employed in accordance with the CPU 102 of the present invention. Such techniques are known and will not be further described herein except to expand upon the teachings of the present invention.

Figure 2:
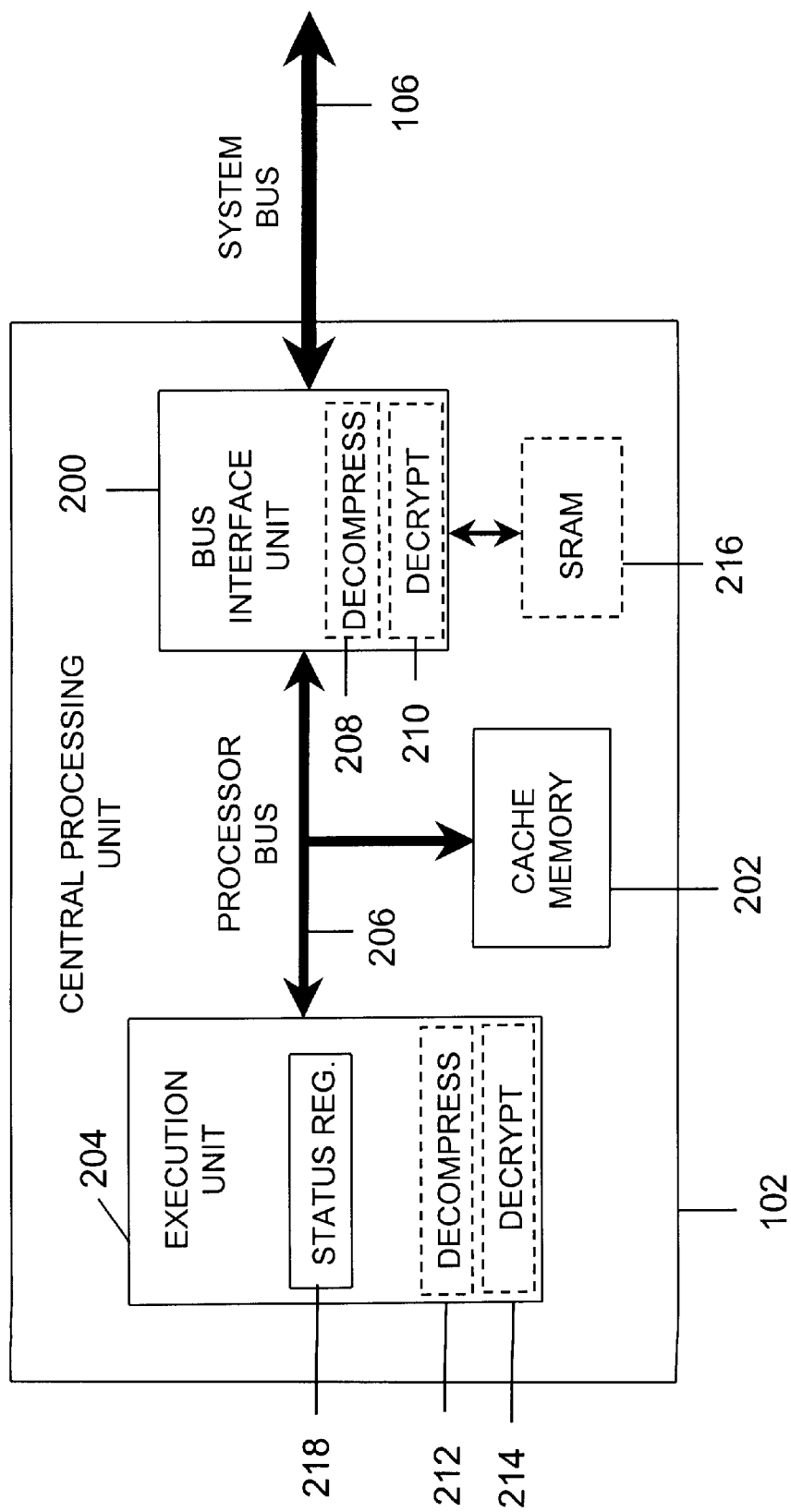
FIG. 2 is a block diagram illustrating a possible embodiment of the CPU of FIG. 1 showing in detail a bus interface unit, cache memory and an execution unit operable to perform the compression/decompression and encryption/decryption operations of the present invention.

FIG. 2 is a block diagram illustrating an embodiment of the CPU 102 of FIG. 1 showing in detail a bus interface unit 200 (hereinafter "BIU"), cache memory 202 and an execution unit 204 coupled to one another by a processor bus 206. The components operate to perform the compression/decompression and/or encryption/decryption operations of the present invention. System bus 106 connects the BIU 200 to memory 104 and operates at a relatively slower clocking frequency than the processor bus 206.

Decompression circuitry and related functionality within the CPU 102 may comprise decompression circuitry 208 residing within the BIU 200, decompression circuitry 212 residing within the execution unit 204 or may comprise a combination of the two depending upon the implementation and mode of operation. Further, decryption circuitry and related functionality within the CPU may comprise decryption circuitry 210 residing within the BIU 200, decryption circuitry 214 residing within the execution unit 204 or may comprise a combination of the two. The BIU 200 may include a block of static random access memory (SRAM) employed in the decompression and decryption of data transferred from memory across the system bus 106. Decompression and decryption circuitry may comprise hardware, firmware or a combination of hardware and firmware.

The processor bus 206 comprises data, address and control portions and enables operation of the execution unit 204 in conjunction with the cache memory 202 such that the execution unit 204 may access data from the cache memory 202 in a single CPU clock cycle. The cache memory 202 therefore comprises fast SRAM capable of operating at clocking frequencies that enable operation of the execution unit 204 at each CPU clock cycle.

As will be more fully described hereinafter, the BIU 200 may perform decompression and/or encryption with the decompression circuitry 208 and decryption circuitry 210 as the data is received from memory over the system bus 106 and prior to writing the decompressed/decrypted data into cache memory 202. Alternatively, the BIU 200 may transfer compressed and/or encrypted data from memory over the system bus 106 into cache memory 202 without decompressing and/or decrypting the data. The BIU 200 makes a determination whether and how to decompress and/or decrypt data based upon the contents of a status register 218 in the CPU 102 (shown residing in the execution unit 204). The contents of the status register 218 are set by the execution unit 204 based upon the data to be transferred from memory.

In a typical operation, the execution unit 204, at the initiation of execution of a particular target process, determines whether any and/or all instructions and data for the target process are stored in a compressed and/or encrypted fashion in bulk storage. The execution unit 204 then sets the contents of the status register 218 accordingly. The contents of the status register 218 may change from target process to target process and may change as differing portions of the target process are executed. The BIU 200 and the execution unit 204 therefore examine the status register 218 when accessing data and perform such accesses accordingly.

The BIU 200 and execution unit 204 also include compression and encryption circuitry that operates analogously to the decompression and decryption circuitry. Data written to memory across the system bus 106 therefore has been correctly compressed, encoded and encrypted before it is written to memory. Because decompression/compression, decoding/encoding and decrypting/encrypting operations are performed completely within the CPU 102, memory (both RAM and bulk storage) operation is unaffected with such operations being transparent to the memory.

Unlike prior art systems, all encryption and decryption occurs within the CPU 102. In the data processing system 100 of the present invention, all data stored in memory (both RAM and bulk storage) may therefore be stored in an encrypted format. Without accessing memory via the CPU 102, devices connected to the data processing system 100 via a network may only access encrypted data. Therefore, even though another device may penetrate a firewall that has been established for the data processing system 100 and access memory and bulk storage, the other device may only access encrypted that may only be decrypted by the CPU 102. Thus, without decryption by the CPU 102, the encrypted data is of no value to the other device.

Figure 3A:
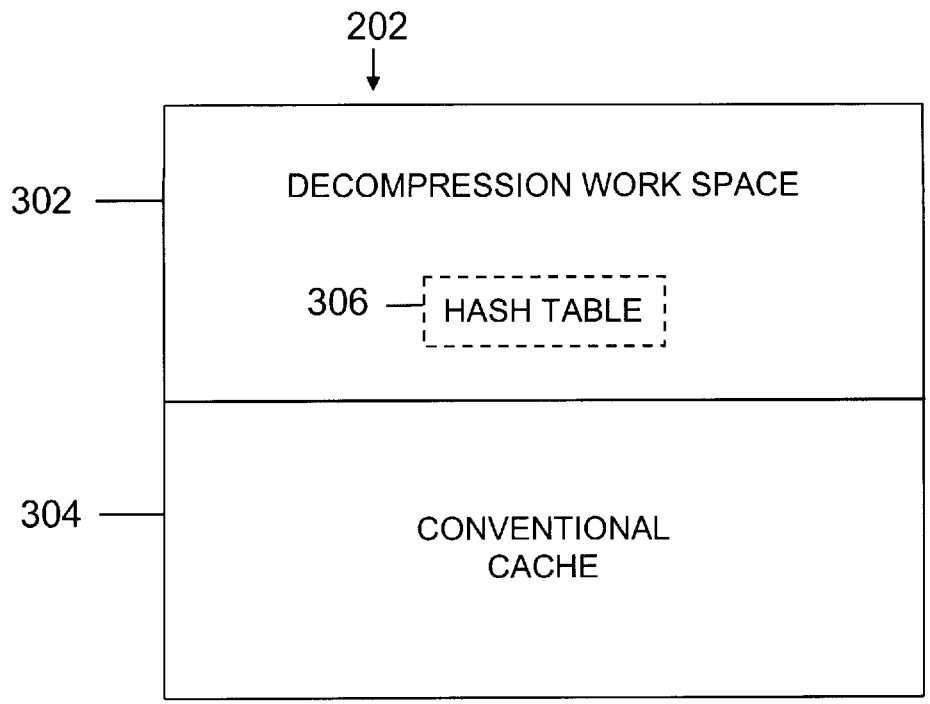
FIG. 3a illustrates an embodiment of a cache memory organization of the cache memory of the data processor of FIG. 2.

FIG. 3a illustrates a possible organization of the cache memory 202 of the CPU 102 of FIG. 2. As illustrated, the cache memory 202 is segregated into decompression work space 302 and conventional cache space 304. This division may divide the cache memory 202 substantially equally or may simply be apportioned and assigned based upon the immediate operational requirements. For example, during transfer of a block of data of 8 kilobytes from memory 104 to conventional cache 304 that requires decompression upon transfer, the BIU 200 may require a relatively large segment of the cache memory 202 as decompression work space 302. However, once the BIU 200 has completed the transfer and decompression and has written the decompressed data to conventional cache 304, the BIU 200 no longer requires the work space 302 and releases the work space 302 for conventional caching functions.

The decompression work space 302 of the cache memory 202 may include a hash table 306. As known, hash tables may be used to decompress and decrypt data. Typically, the compressed and/or encrypted data would be input to a hashing function that is stored as firmware in the BIU 200 (or the execution unit 204 depending upon the implementation). The hashing function produces a hash value that is compared to the hash table entries to produce a result. A hashing function and related hash table 306 used for data decompression receives compressed data as input and produces uncompressed data as output. The uncompressed data then is stored in conventional cache 304 or directly provided to the execution unit 204.

In another mode of operation, compressed and/or encrypted data is stored in the decompression work space 302 until accessed by the execution unit 204. Upon an access, the execution unit 204 decompresses and/or decrypts the data to produce expanded, decrypted data. The execution unit 204 may then write altered data to conventional cache 304, depending upon the mode of operation. In this mode of operation, therefore, the execution unit 204 accesses the hash table 306 when performing hashing functions upon the compressed and/or encrypted data.

Hashing functions and other procedures for decompressing/decrypting data are known. The particular decompression techniques employed by the present invention are selected and optimized for the particular embodiment to increase throughput. Decryption and encryption techniques are optimized to maximize system security. The decryption/encryption techniques employed require machine identification to function properly. Thus, data processing systems other than the particular data processing system may not decrypt encrypted data that was previously encrypted and written to memory by the particular data processing system in an encrypted format.

Figure 3B:
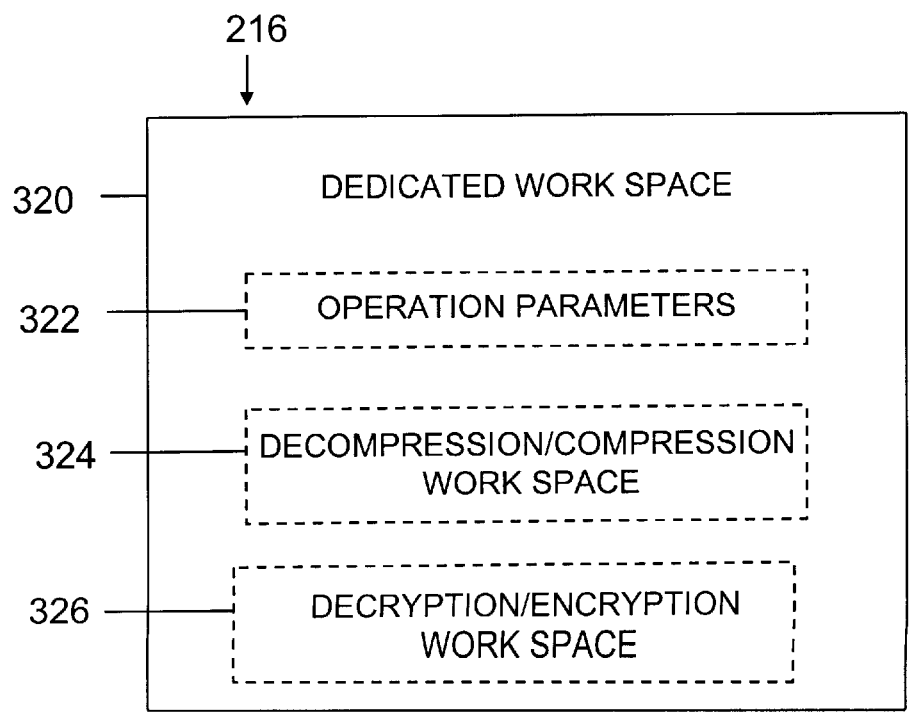
FIG. 3b illustrates an organization of dedicated SRAM that may be employed by the bus interface unit of the data processor illustrated in FIG. 2.

FIG. 3b illustrates an organization 216 of dedicated SRAM 216 that may be employed by the BIU 200 of the CPU 102 illustrated FIG. 2. In the embodiment, the SRAM 216 provides dedicated work space 320 used by the BIU 200 during compression, decompression, decryption and encryption operations. The work space 320 includes space for operation parameters 322, decompression/compression work space 324 and decryption/encryption work space 326. The operation parameters relate to the particular operations to be performed by the BIU 200. These parameters relate to the type of compression/decompression employed, the type of encryption/decryption employed, the manner in which incoming data is to be decompressed and decrypted, the manner in which the data is stored in cache or transferred to the execution unit 204 and other parameters relating to operation of the BIU 200.

Figure 4:
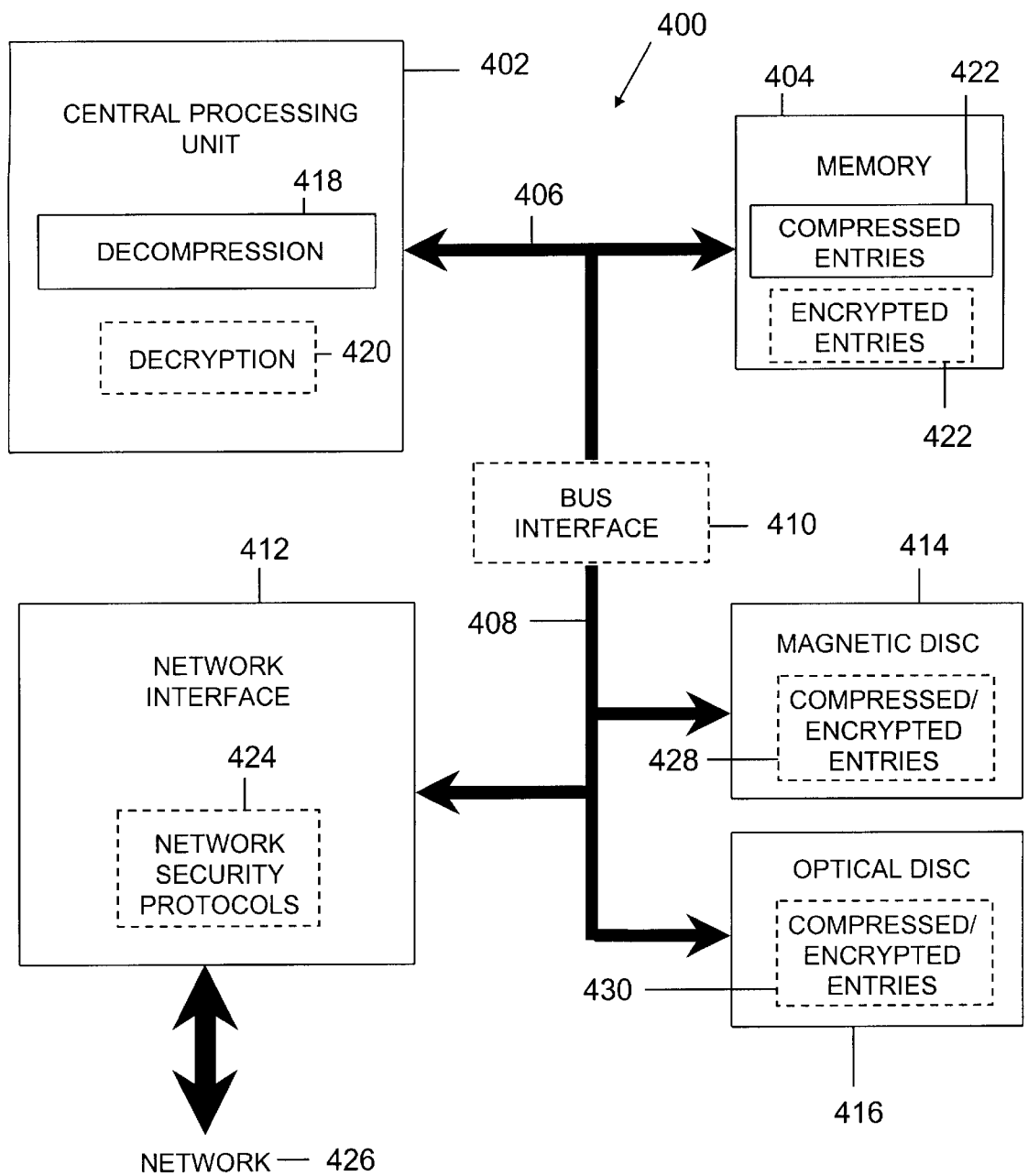
FIG. 4 is a block diagram illustrating an alternative embodiment of a data processing system of the present invention operable such that the CPU provides the sole mechanism for decrypting encrypted data stored on the various storage devices of the system.

FIG. 4 is a block diagram illustrating an alternative embodiment of a data processing system 400 of the present invention. The data processing system 400 comprises a CPU 402, memory 404, system bus 406, peripheral bus interface unit 410, a network interface 412, peripheral bus 408, a magnetic disc 414 and an optical disc 416. The components of the system 400 are operable such that the CPU 402 provides the sole mechanism for decrypting encrypted data stored on the various storage devices of the system 400.

The CPU 402 includes decompression circuitry 418 and decryption circuitry 420. As was previously described, the decompression circuitry 418 operates upon compressed data 422 retrieved from memory 404, compressed data 428 retrieved from magnetic disc 414, compressed data 430 retrieved from optical disc 416 and compressed data retrieved from other storage in system 400 to produce the data in an uncompressed format. Techniques previously described are employed by the CPU 402 in performing such decompression operations. The CPU 402 may also include compression circuitry for compressing uncompressed data and for writing the compressed data to memory 404, magnetic disc 414 and/or the optical disc 416.

The CPU 402 also includes decryption circuitry 420 for decrypting encrypted data 422 retrieved from memory 404, encrypted data 428 retrieved from magnetic disc 414, encrypted data 430 retrieved from the optical disc 416 and other encrypted data that may be retrieved from other storage. Techniques previously described are employed by the CPU 402 in performing such decryption operations. The CPU 402 also includes encryption circuitry for encrypting data prior to writing the data to storage.

Peripheral bus interface 410 interfaces the system bus 406 with a peripheral bus 408. The peripheral bus 408 may comprise a PCI bus, an ISA bus, an IDE bus, a SCSI bus or other bus that allows a data processing system 400 to connect to peripheral devices. The magnetic disk 414, optical disk 416 and the network interface 412 each couple to the peripheral bus 408, and effectively, to each other. Data transfers between the system bus 406 and peripheral bus 408 are performed by the peripheral bus interface 410 without regard to the type of data being transferred. Thus, compressed, encoded and encrypted data are transferred across the peripheral bus 408 and between the peripheral bus 408 and the system bus 406 without regard to its format.

The network interface 412 couples to a network 426 that may comprise a wired network or a wireless network. The network 426 could comprise a local area network, a wide area network, a global area network, the internet or other network that enables communication between physically separated resources. The network interface 412 may include network security protocols 424 to protect the security of the data processing system 400 from intrusions over the network 426. Such network security protocol 424 may comprise a hardware firewall, a software firewall or firmware dedicated to limiting access to the data processing system 400. As previously discussed, however, network security protocols 424 are not fail-safe and often permit intrusions.

Thus, the data processing system 400 may operate such that all data stored on the magnetic disk 414, the optical disk and in memory 404 is stored in an encrypted format. Data transfers across the peripheral bus 408 and system bus 406 each comprise only the transfer of encrypted data. The CPU 402, based upon its unique identifier, provides the only mechanism for decrypting the encrypted data. Thus, access to any data stored in the data processing system 400 requires participation of the CPU 402 and the CPU 402 may be programmed to allow limited access only to selected devices. Even a physical intrusion within the data processing system 400 will fail to yield results because encrypted data that could be removed from a storage device could not be decrypted without participation of the CPU 402.

Figure 5:
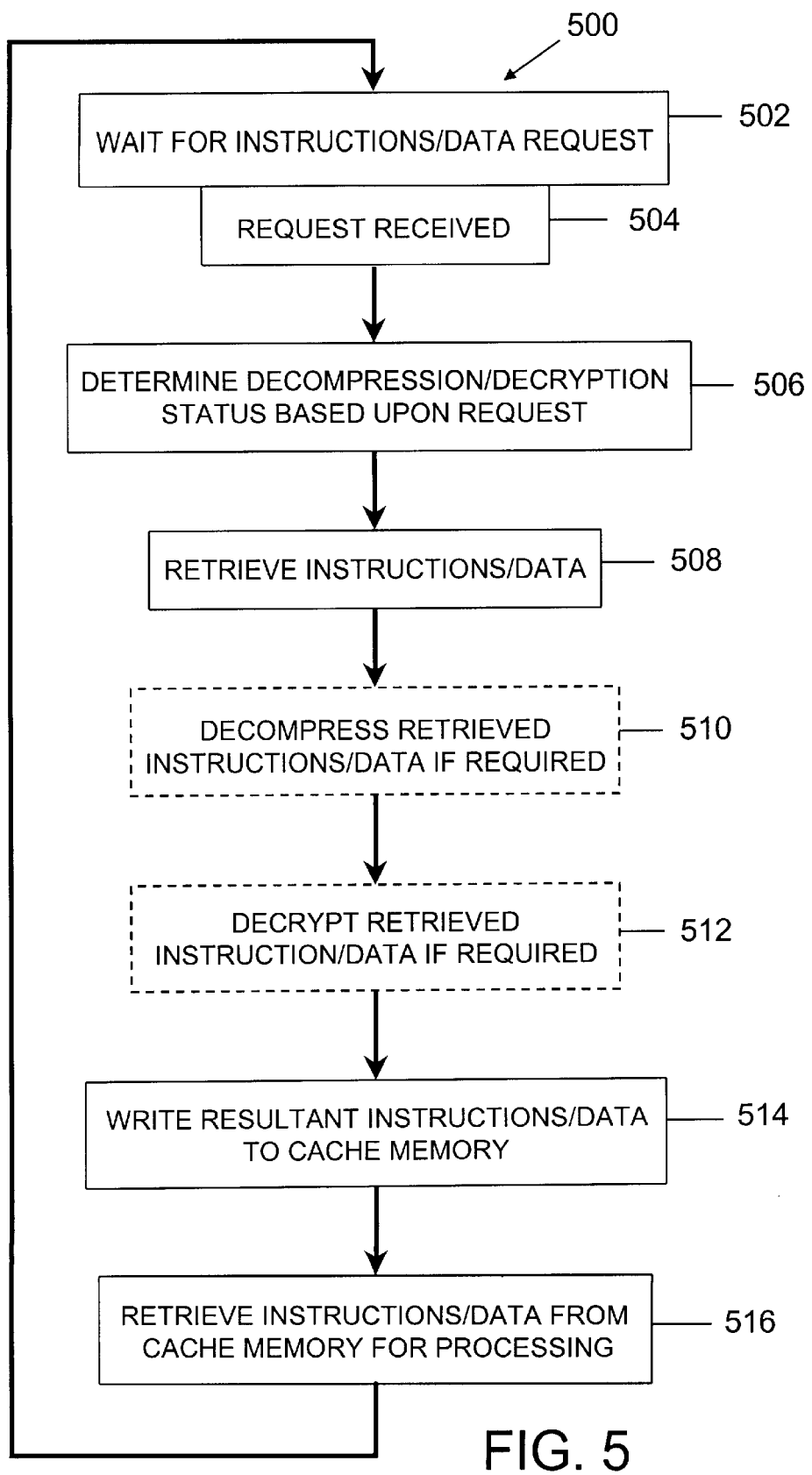
FIG. 5 is flow diagram illustrating operation of the data processor of the present invention during retrieval, decompression and decryption of data from RAM, bulk storage or other storage medium accessible by the data processor of FIG. 2.

FIG. 5 is flow diagram illustrating operation 500 of the data processor 102 of the present invention during retrieval, decompression and decryption of data from RAM, bulk storage or other storage medium accessible by the data processor 102 of FIGS. 1 and 2. Illustrated steps may be performed by a BIU 200 or execution unit 204, by both the BIU 200 and execution unit 204 or by other components within the CPU 102. The operations will be described with reference to the BIU 200 or the execution unit 204, depending upon a most likely scenario. However, discussion of the operation in conjunction with a particular element of the data processor 102 is for illustration purposes only and does not limit the scope or applicability of the invention.

In a waiting state, the BIU 200 awaits an instructions/data request 502 from the execution unit 204 (typically referred to as a "page fault"). The execution unit 204 makes such a request when data it is to operate upon is not present in cache memory 202. When the CPU 102 includes a pipeline unit, the pipeline unit may issue a page fault to the BIU 200 while the execution unit 204 continues to operate upon data present in cache memory 202.

Upon receipt of an instructions/data request 504, the BIU 200 determines the decompression/decryption status based upon the request 506. In the embodiment described, the BIU 200 reads the contents of the status register 218 to determine whether, and what type of decompression and decryption to perform upon data retrieved from memory. The BIU 200 may determine the status while issuing commands to memory or bulk storage.

The BIU 200 next retrieves the instructions/data 508 from memory or storage using conventional techniques. Retrieval from memory typically includes simply asserting address and control signals to the system bus 106 that cause the memory 104 to write the desired data upon the bus 106. With the requested data on the system bus 106, the BIU 200 receives the data.

Based upon the decompression/decryption status previously determined at 506, the BIU 200 decompresses and decrypts the retrieved instructions/data 510. Such decompression and decryption may be accomplished in various fashions depending upon the application. Decompression and/or decryption may be accomplished using a hashing function as was previously described or by another technique. During the decompression and decryption steps, the BIU 200 may use the work area 302 of the cache memory 202 described with respect to FIG. 3*a* or the dedicated work space 320 of the SRAM 216 as described with respect to FIG. 3*b*.

Once the instructions/data is decompressed and/or decrypted, the BIU 200 writes the resultant uncompressed and/or decrypted data to cache memory 514. The execution unit 204 then retrieves the resultant data from cache memory 202 as required for continued processing.

Writes to memory of compressed and/or encrypted data are accomplished in an analogous fashion. The BIU 200 determines the decompression/decryption status, converts data to its compressed/encrypted format and writes the data to memory 104. Once the compressed/encrypted data has been written to memory, the peripheral bus interface 410 may write the data to bulk storage in accordance with standard system operation. Thus, as was previously discussed, the compression/decompression and encryption/decryption techniques of the present invention are transparent to other system components. However, the techniques and procedures may be employed to fully encrypt data stored on the memory and bulk storage devices of the system.

Figure 6:
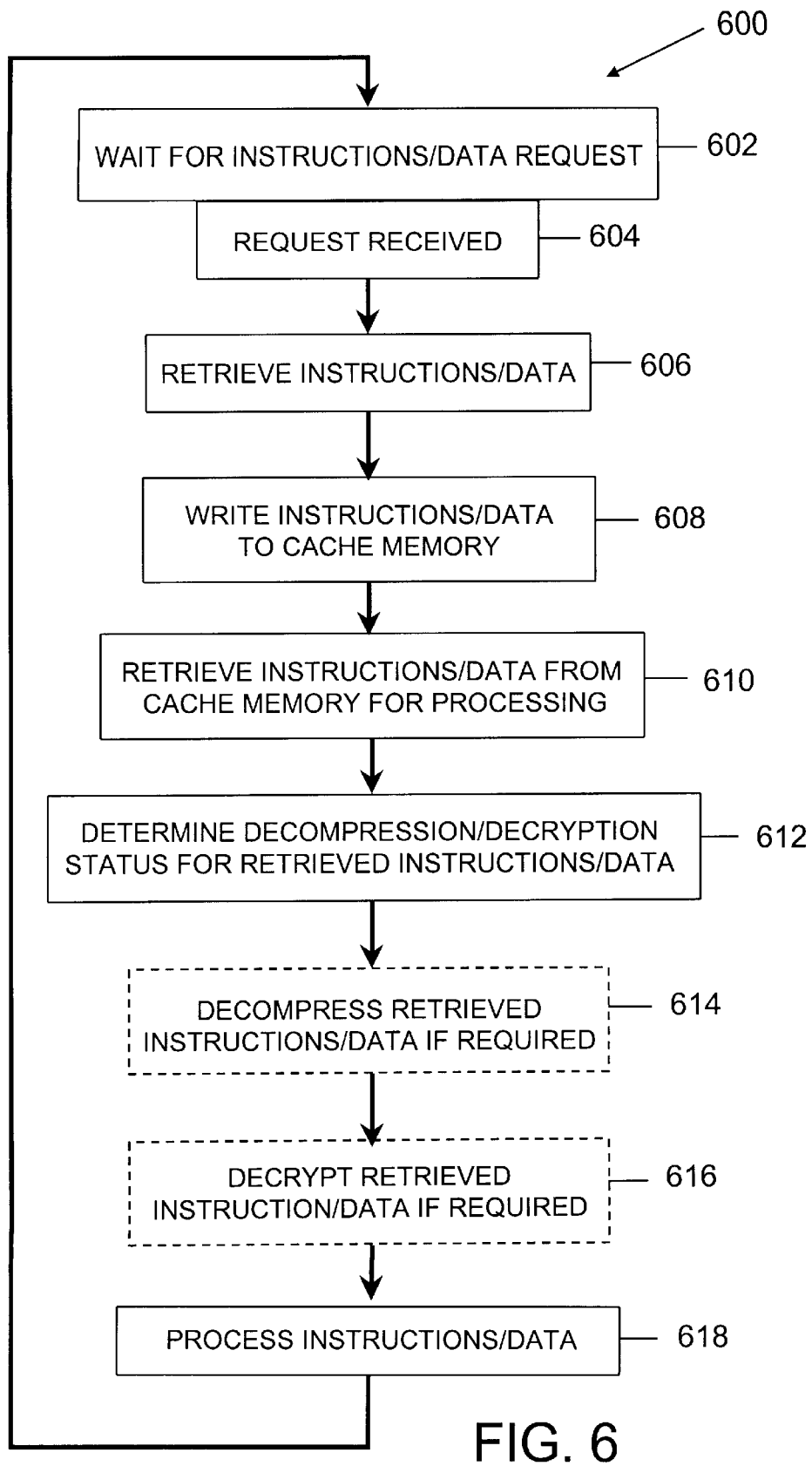
FIG. 6 is a flow diagram illustrating an alternative operation of the data processor of the present invention during retrieval, decompression and decryption of data wherein the CPU of the data processor performs decompression and decryption operations only upon instructions to be executed by the CPU and upon data to otherwise be operated upon by the CPU.

FIG. 6 is a flow diagram illustrating an alternative operation 600 of the data processor (CPU) 102 of the present invention during retrieval, decompression and decryption of data. In the operation 600 of FIG. 6, the CPU 102 performs decompression and decryption operations only upon instructions that are to be executed by the execution unit 204 or data that is to be otherwise operated upon by the execution components of the CPU 102.

Operation 600 commences with the BIU 200 waiting for an instructions/data request 602 from the execution unit 204. Upon receipt of the request 604, the BIU 200 accesses memory 104 or bulk storage to retrieve the instructions/data 606. Once retrieved, the BIU 200 writes the instructions/data 608 to a portion of cache memory 202 dedicated to the storage of compressed/encrypted data. The dedicated portion of cache memory 202 may be segregated from portions of cache memory 202 that store expanded/decrypted data. In one particular implementation of the present invention, compressed/encrypted data is indexed in an identical fashion to expanded/decrypted data but segregated to prevent erroneous reads of compressed/encrypted data when uncompressed decrypted data is expected.

Next, the execution unit 204 retrieves the compressed/encrypted instructions/data from the cache memory 202 for processing. The execution unit 204 may retrieve the instructions/data directly or may direct the BIU 200 to perform the retrieval. Thus, until the execution unit 204 requires the instructions/data, the instructions/data remain in the compressed/encrypted state in storage. At retrieval, the execution unit 204 or BIU 200 determines the decompression/decryption status for the retrieved instructions/data 612. This status may be contained in a status register 218 as previously described or in a table in cache memory 202. As previously described, in one embodiment, indexing protocol remains consistent independent of the data format to simplify operation.

After determining the status for the retrieved instructions/data, the execution unit 204 or BIU 200 decompresses 614 and/or decrypts the retrieved instructions/data based upon the decompression/decryption status for the retrieved instructions/data. Once the instructions/data have been decompressed and decrypted, the execution unit 204 or other CPU 102 component processes the instructions/data 618. Thus, as compared to the process 500 of FIG. 5, the process of FIG. 6 delays the decompressing/decryption of data retrieved from memory until the data is required for processing.

Figure 7:
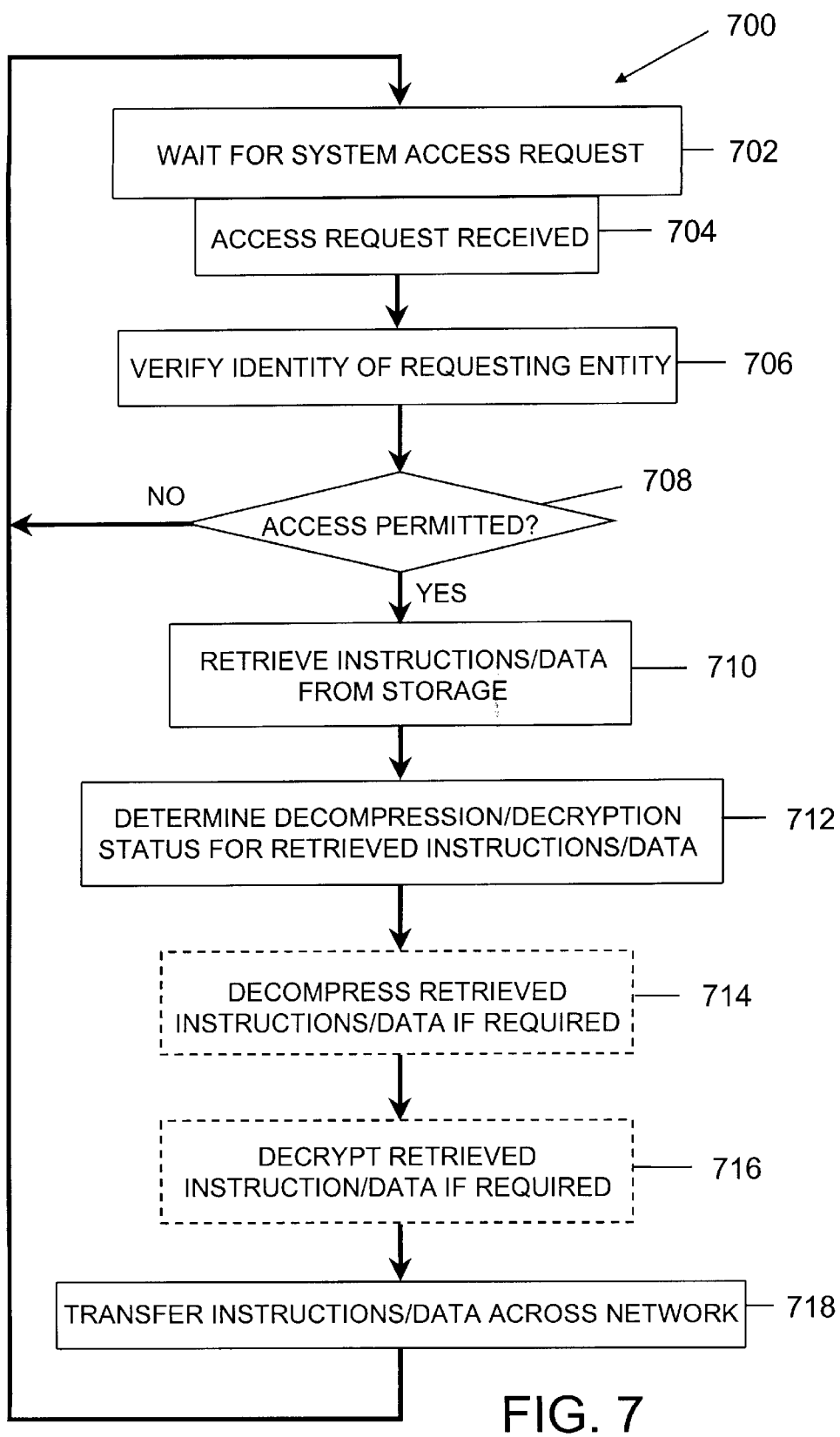
FIG. 7 is a flow diagram illustrating operation of a data processing system of the present invention during access of stored data within the data processing system by a device connected to the data processing system through a network.

FIG. 7 is a flow diagram illustrating operation 700 of the data processor 102 of the present invention during access of stored data within the data processing system by a device connected to the data processing system through a network. Operation commences wherein the system 100 waits for a system access request 702. The network interface 412 initially receives the system access request 412 and then issues an interrupt over the peripheral bus 408. The peripheral bus interface 410 receives the interrupt and then notifies the CPU 402 over the system bus 406 of the system access request 702. The CPU 402 then receives the system access request 704 over the system bus 406 from the peripheral bus interface 410. Alternatively, the network interface 412 could issue a direct interrupt to the CPU 402 if the data processing system 100 were so configured.

Upon receipt of the system access request, the CPU 402 verifies the identity of the requesting entity 706. Network security protocol 424 implemented by the network interface 412 as well as additional verification performed by the CPU 402 determines whether the requesting entity is allowed access to data stored in the data processing system 100. If access is permitted at decision 708, the CPU 402 retrieves the instructions/data from storage 710. However, if access is not permitted, an error message is transmitted to the requesting entity and the system 100 resumes processing.

During or after retrieval of the instructions/data 710, the CPU 102 (the BIU 200, the execution unit 204 or another unit) determines the decompression/decryption status for the retrieved instructions/data 712. Depending upon the decompression/decryption status, the CPU 102 decompresses 714 and/or decrypts 716 the retrieved instructions/data as required. If the retrieved instructions/data were stored in an uncompressed and unencrypted format, no operations are required. Next, the CPU 102 directs the transfer of the instructions/data across the network 426 to the requesting entity. In a typical transfer, the CPU 102 would write the data across the system bus 406, through the bus interface 410 and across the peripheral bus 408 to the network interface 412. The network interface then packages the instructions/data into appropriate packets for transfer and transfers the packets across the network 426 to the requesting entity.

In one embodiment of the data processing system 100 of the present invention, security sensitive instructions/data are stored in an encrypted format on magnetic disc 414 and in the optical disc 416. Upon an access of the magnetic disc 414 and optical disc 416 by memory 404, encrypted data is transferred to and from memory 404. Any attempted direct access of the storage devices would result in, at most, encrypted data. Thus, the data processing system 100 of the present invention provides an additional layer of security to those data processing systems networked to other devices.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

I claim:

1. A data processor comprising:

processor bus;

bus interface unit, connected on a first side to the processor bus and on a second side to a system bus, that retrieves executable code that has been encrypted and compressed from storage over the system bus;

decompression circuitry coupled to the processor bus that receives and decompresses the executable code that has been encrypted and compressed to produce executable code that has been encrypted;

decryption circuitry coupled to the processor bus that receives and decrypts the executable code that has been encrypted to produce executable code that has been decompressed and decrypted; and at least one execution unit coupled to the processor bus that retrieves and executes the executable code that has been decompressed and decrypted.

2. The data processor of claim 1, further comprising cache memory coupled to the processor bus, and wherein the decryption circuitry writes the executable code that has been decompressed and decrypted to the cache memory and the execution unit retrieves executable code from the cache memory.

3. The data processor of claim 1, further comprising cache memory coupled to the processor bus, wherein the bus interface unit writes the executable code that has been encrypted and compressed to the cache memory, wherein the decompression circuitry reads the executable code that has been decompressed and encrypted from the cache memory upon request from the execution unit, decompresses the executable code that has been compressed and encrypted to produce the executable code that has been encrypted and wherein the decryption circuitry receives and decrypts the executable code that has been encrypted and provides executable code to the execution unit.

4. The data processor of claim 3, wherein the cache memory comprises a decompression workspace and a conventional portion.

5. The data processor of claim 1, wherein the decompression circuitry employs hash lookup techniques to decompress the executable code that has been encrypted and compressed.

6. The data processor claim 1, further comprising:

a network connection coupled to the system bus; and bulk storage connected to the system bus that store executable code in an encrypted format that is decryptable only by the decryption circuitry.

7. A data processor comprising:

processor bus;

bus interface unit, connected on a first side to the processor bus and on a second side to a system bus, that retrieves executable code that has been compressed and encrypted from storage over the system bus; decryption circuitry coupled to the processor bus that receives and decrypts the executable code that has been compressed and encrypted to produce executable code that has been compressed;

decompression circuitry coupled to the processor bus that receives and decompresses the executable code that has been compressed to produce executable code that has been decrypted and decompressed; and at least one execution unit coupled to the processor bus that retrieves and executes the executable code that has been decrypted and decompressed.

8. The data processor of claim 7, further comprising cache memory coupled to the processor bus, and wherein the decompression circuitry writes executable code that has been decrypted and decompressed to the cache memory and the execution unit retrieves the executable code from the cache memory.

9. The data processor of claim 7, further comprising cache memory coupled to the processor bus, wherein the bus interface unit writes the executable code that has been compressed and encrypted to the cache memory, wherein the decryption circuitry reads the executable code that has been compressed and encrypted from the cache memory upon request from the execution unit, decrypts the executable code to produce executable code that has been compressed and wherein the decompression circuitry decompresses the executable code that has been compressed and provides executable code to the execution unit.

10. The data processor of claim 9, wherein the cache memory comprises a decryption workspace and a conventional portion.

11. The data processor of claim 7, wherein the decryption circuitry employs hash lookup techniques to decrypt the executable code that has been compressed and encrypted.

12. The data processor claim 7, further comprising:

a network connection coupled to the system bus; and bulk storage connected to the system bus that includes entries stored in an encrypted format that is decryptable only by the decryption circuitry.

13. A method of receiving and processing executable code in a processor including internal decompression circuitry, internal decryption circuitry and internal execution circuitry, comprising:

receiving executable code that has been encrypted and compressed into the processor;

decompressing within the processor, by the decompression circuitry, the executable code that has been encrypted and compressed to obtain executable code that has been encrypted;

decrypting within the processor, by the decryption circuitry, the executable code that has been encrypted to obtain decompressed and decrypted executable code; and executing, by the execution circuitry, the decompressed and decrypted executable code within the processor.

14. The method of claim 13, further comprising:

storing the decompressed and decrypted executable code within the processor prior to executing the decompressed and decrypted executable code.

15. The method of claim 13, further comprising:

storing the executable code that has been encrypted and compressed within the processor prior to decompressing and decrypting the executable code that has been encrypted and compressed.

16. A method of receiving and processing executable code in a processor including internal decryption circuitry, internal decompression circuitry and internal execution circuitry, comprising:

receiving executable code that has been compressed and encrypted into the processor;

decrypting, by the decryption circuitry, the executable code that has been compressed and encrypted within the processor to obtain executable code that has been compressed;

decompressing, by the decompression circuitry, the executable code that has been compressed to obtain executable code; and executing, by the execution circuitry, the executable code within the processor.

17. The method of claim 16, further comprising:

storing the executable code that has been decrypted and decompressed within the processor prior to executing the executable code that has been decrypted and decompressed.

18. The method of claim 16, further comprising:

storing the executable code that has been compressed and encrypted within the processor prior to decrypting and decompressing the executable code that has been compressed and encrypted.

* * * * *